United States Patent
Dette et al.

(10) Patent No.: US 9,688,548 B2
(45) Date of Patent: Jun. 27, 2017

(54) APPARATUS AND PROCESS FOR DESALINATION OF WATER

(71) Applicant: Sulzer Chemtech AG, Winterthur (CH)

(72) Inventors: Severine Dette, Winterthur (CH); Mansour M. M Ahmad, Al-Jabriya (KW); Manfred Stepanski, Buchs (CH)

(73) Assignee: Sulzer Chemtech AG, Winterthur (CH)

( * ) Notice: Subject to any disclaimer, the term of this patent is extended or adjusted under 35 U.S.C. 154(b) by 176 days.

(21) Appl. No.: 14/419,602

(22) PCT Filed: Feb. 13, 2013

(86) PCT No.: PCT/EP2013/052847
§ 371 (c)(1),
(2) Date: Feb. 4, 2015

(87) PCT Pub. No.: WO2014/023438
PCT Pub. Date: Feb. 13, 2014

(65) Prior Publication Data
US 2015/0203373 A1    Jul. 23, 2015

(30) Foreign Application Priority Data
Aug. 8, 2012  (EP) .................................. 12179663

(51) Int. Cl.
*C02F 1/44* (2006.01)
*C02F 1/22* (2006.01)
(Continued)

(52) U.S. Cl.
CPC ............. *C02F 1/441* (2013.01); *B01D 61/08* (2013.01); *C02F 1/22* (2013.01); *C02F 1/008* (2013.01);
(Continued)

(58) Field of Classification Search
None
See application file for complete search history.

(56) References Cited

U.S. PATENT DOCUMENTS 4,083,781 A    4/1978   Conger
4,115,274 A    9/1978   Boddeker et al.
(Continued)

FOREIGN PATENT DOCUMENTS

CN          101759250 A        6/2010
DE   10 2004 058 907 A1        6/2006
(Continued)

OTHER PUBLICATIONS

Madani A A et al: "A Combined RO/Freezing System to Reduce Inland Rejected Brine", Desalination, Nov. 1, 1989, pp. 241-258, vol. 75, No. 1 / 03, ISSN: 0011-9164, Publisher: Elsevier Science Publishers B.V., Amsterdam, NL, DOI: 10.1016/0011-9164(89)85016-7.

*Primary Examiner* — Krishnan S Menon
*Assistant Examiner* — Bradley R Spies
(74) *Attorney, Agent, or Firm* — Larson & Anderson, LLC

(57) ABSTRACT

A process for desalinating water is disclosed. The process comprises the steps of passing a feed stream of saline solution 2' in a first desalination step through a reverse osmosis membrane desalination plant 3' comprising at least one reverse osmosis desalination unit 4' to form a first product water stream 5' having a reduced salt concentration relative to that of the feed stream of saline solution 2' and a first byproduct stream 6' having an increased salt concentration relative to that of the feed stream of saline solution 2' characterized in that the first byproduct stream 6' is passed in a second desalination step through a suspension crystallization unit 7 to form a second product water stream 8 having a reduced salt concentration relative to that of the (Continued)

first byproduct stream 6' and a second byproduct stream 9 having an increased salt concentration relative to that of the first byproduct stream 6'. The invention further relates to an apparatus 1 for carrying out said process. The present invention further relates also to the use of the process or apparatus 1 for the reduction of the volume of the first byproduct stream of a reverse osmosis membrane desalination plant 3', preferably an in-land desalination plant 3', or in a device or plant or process for producing desalinated water, for salt production, for co-production of power and desalinated water, or for air conditioning.

19 Claims, 9 Drawing Sheets

(51) Int. Cl.
*B01D 61/08* (2006.01)
*B01D 61/02* (2006.01)
*C02F 1/00* (2006.01)
*C02F 103/08* (2006.01)
*C02F 103/10* (2006.01)
*C02F 101/10* (2006.01)

(52) U.S. Cl.
CPC ...... *C02F 2101/10* (2013.01); *C02F 2103/08* (2013.01); *C02F 2103/10* (2013.01); *C02F 2209/001* (2013.01); *C02F 2209/02* (2013.01); *C02F 2209/05* (2013.01); *C02F 2303/10* (2013.01); *C02F 2303/20* (2013.01); *C02F 2303/22* (2013.01); *Y02W 10/30* (2015.05); *Y02W 10/37* (2015.05)

(56) References Cited

U.S. PATENT DOCUMENTS

| | | | |
|---|---|---|---|
| 4,125,463 A | 11/1978 | Chenoweth | |
| 4,392,959 A * | 7/1983 | Coillet | B01D 61/022 |
| | | | 210/638 |
| 4,434,057 A | 2/1984 | Marquardt | |
| 5,695,643 A | 12/1997 | Brandt et al. | |
| 6,030,535 A | 2/2000 | Hayashi et al. | |
| 6,145,340 A | 11/2000 | Stepanski et al. | |
| 6,241,954 B1 | 6/2001 | Jansen et al. | |
| 6,719,954 B2 | 4/2004 | Jansen | |
| 2002/0159935 A1 * | 10/2002 | Jansen | B01D 9/0013 |
| | | | 422/245.1 |
| 2004/0250746 A1 * | 12/2004 | Verschuur | B01D 9/0013 |
| | | | 117/2 |
| 2007/0246406 A1 * | 10/2007 | Dibel | B01D 61/142 |
| | | | 210/96.2 |
| 2009/0250409 A1 | 10/2009 | Fiene et al. | |
| 2010/0163471 A1 | 7/2010 | Elyanow et al. | |

FOREIGN PATENT DOCUMENTS

| | | |
|---|---|---|
| EP | 2 070 583 A2 | 6/2009 |
| RU | 2393996 C1 | 7/2010 |
| SU | 645666 A | 2/1979 |
| WO | WO0016883 A1 | 3/2000 |
| WO | 2004/013048 A2 | 2/2004 |

* cited by examiner

APPARATUS AND PROCESS FOR DESALINATION OF WATER

BACKGROUND OF THE INVENTION

The present invention relates to a process for desalination of saline solution. The present invention also relates to an apparatus for carrying out this process, and the use of said process or apparatus for the reduction of the volume of concentrated saline solution byproduct of a reverse osmosis membrane desalination plant, or in a device or plant or process for producing desalinated water, for salt production, for co-production of power and desalinated water, or for air conditioning.

In the present application, the term "saline solution" refers to any aqueous solution containing at least one dissolved salt, and the term "first byproduct stream" refers to a concentrated saline solution byproduct obtained from a reverse osmosis (RO) membrane desalination plant. Other examples of concentrated saline solutions include seawater, brackish water, or mining water. It is noted that the saline solution feed stream and the first byproduct stream of a RO membrane desalination plant, as well as the other above examples of concentrated saline solutions, all contain at least one dissolved inorganic salt, typically NaCl.

Fresh water is required for public and domestic water consumption, in farming for irrigation and livestock, and industrially for a variety of processes. In the present application, the term "fresh water" generally refers to water characterized by having low concentrations of dissolved salts and other total dissolved solids and specifically excludes seawater and brackish water. In one embodiment, "fresh water" refers to water containing less than 3,000, preferably less than 1,000, most preferably less than 500 ppm dissolved salts. Drinking water is an example of fresh water. Due to a lack of uniform distribution of fresh water supplies, it is necessary in many regions to obtain fresh water by desalination of a saline solution, for example from the sea. In the present application, the term "first product water stream" refers to the fresh water obtained by the process, apparatus or use of the invention.

Reverse osmosis (RO) is the most widespread technology for desalination of water, and a reverse osmosis desalination apparatus and method are disclosed, for example, in U.S. Pat. No. 4,115,274 or U.S. Pat. No. 4,125,463. It is a membrane separation process in which water is recovered from a saline solution by pressurizing the solution beyond its osmotic pressure and essentially using the membrane to filter out the salt ions from the pressurized solution and allow only the water to pass. The main energy consumption in RO technology results from the pressurization of the saline solution. Relatively low energy consumption with RO technology can be advantageously obtained when the energy losses resulting from releasing the pressure of the concentrated saline solution are minimized by using devices to recover the mechanical compressive energy from the discharged concentrated saline solution stream (first byproduct stream). RO technology is the most widespread commercial technology for desalination due to its favorable economics largely resulting from relatively favorable energy consumption.

Nonetheless RO technology has its disadvantages. Since the pressure required to recover additional fresh water increases as the saline solution or brine stream is concentrated, the water recovery rate of RO systems tends to be low. A related further major disadvantage is then the cost and environmental impact of disposing of the large volume streams of concentrated saline solution byproduct (first byproduct streams) from the RO plant, particularly for inland RO plants. For example, the saline solution byproduct is often discharged to the sea or inland surface water or injected into deep wells. Such practices are not environmentally friendly, and thus they are no longer acceptable. Therefore it would be desirable to have a process and an apparatus for increasing the volume of fresh water recovered, reducing the volume of the first byproduct stream (concentrated saline solution) from RO plants, and without inducing additional harm to the environment.

Thermally-based concentration methods to reduce the volume of first byproduct streams of RO systems are known, such as the flash evaporation method disclosed in U.S. Pat. No. 4,083,781, the forced evaporation method disclosed in U.S. Pat. No. 4,434,057; and the combustion heat evaporation method of U.S. Pat. No. 5,695,643. Such thermally-based concentration methods have the disadvantage of being energy intensive and thus costly. In addition, they are susceptible to scale formation and its associated thermal and mechanical problems. Alternatively, first byproduct streams may be concentrated by solar ponds having low energy costs, but this thermal method requires large amounts of land and direct sunlight and suffers from low productivity and expensive and time consuming maintenance. Furthermore solar thermal methods are not applicable to all regions and/or climates in that the presence of dust may block sunlight and/or surface area for evaporation, thereby increasing the time required for evaporation. In addition, the evaporated water is lost to the environment in the case of a pond, and it is not available then as a supply of drinking water. Finally toxic compounds such as sulfur-based compounds may evaporate and be transferred to the environment resulting in EHS issues.

Electrodialysis methods are also known for treating the first byproduct streams of RO systems. For example, an integrated RO and electrodialysis system is known from EP 2 070 583 A2, and the method of U.S. Pat. No. 6,030,535 uses a combination of an electrodialysis unit and evaporator to treat the concentrated saline solution byproduct stream from an RO system. Electrodialysis methods suffer the disadvantage though of being sensitive to membrane fouling and scaling, and they also require large quantities of direct current and their electric fields are only capable of removing ionic components. In conclusion, it would be desirable to have a process and apparatus to reduce the volume of concentrated saline solution byproduct streams of RO systems that has reduced energy requirements without requiring large infrastructures and without being susceptible to membrane fouling and having reduced susceptibility to scaling.

SUMMARY OF THE INVENTION

Starting from this state of the art, it is an object of the invention to provide a process for reducing the volume of first byproduct streams from RO plants. Further objects of the invention include providing an apparatus suitable for use in said process, and the use of said process or apparatus for the reduction of the volume of the first byproduct stream of a reverse osmosis membrane desalination plant, or in a device or plant or process for producing desalinated water, for salt production, for co-production of power and desalinated water, or for air conditioning.

According to the invention, these objects are achieved by a process for desalinating water, said process comprising the steps of: (i) passing a feed stream of saline solution in a first desalination step through a reverse osmosis membrane desalination plant comprising at least one reverse osmosis desalination unit to form a first product water stream having a reduced salt concentration relative to that of the feed stream of saline solution and a first byproduct stream having an increased salt concentration relative to that of the feed stream of saline solution, wherein (ii) the first byproduct stream is passed in a second desalination step through a suspension crystallization unit to form a second product water stream having a reduced salt concentration relative to that of the first byproduct stream and a second byproduct stream having an increased salt concentration relative to that of the first byproduct stream.

According to the invention, these further objects are achieved firstly by an apparatus comprising: a reverse osmosis (RO) membrane desalination plant comprising at least one reverse osmosis desalination unit having an inlet for a feed stream of saline solution, an outlet for a first product water stream, an outlet for a first byproduct stream, wherein the outlet for the first byproduct stream is in fluid connection with an inlet of a suspension crystallization unit having an outlet for a second product water stream, and an outlet for a second byproduct stream. Said apparatus is used in accordance with the invention for the reduction of the volume of the first byproduct stream of a reverse osmosis membrane desalination plant, preferably an in-land desalination plant, or in a device or plant or process for producing desalinated water, for salt production, for co-production of power and desalinated water, or for air conditioning.

The present invention achieves these objects and provides a solution to this problem by means of passing the first byproduct stream in a second desalination step through a suspension crystallization unit to form a second product water stream having a reduced salt concentration relative to that of the first byproduct stream and a second byproduct stream having an increased salt concentration relative to that of the first byproduct stream. As a result, the first byproduct stream of an RO membrane desalination plant having a relatively high salt concentration is readily concentrated further by the suspension crystallization to give a reduced volume of high salinity solution (waste concentrated brine) as the second byproduct stream and a second product water stream having a reduced salt concentration and thus suitable for recycling or other applications. Therefore the overall waste volume is significantly reduced.

Furthermore the second product water stream may be advantageously of drinking water quality to increase the productivity of the process. Alternatively the second product water stream may be advantageously fed to the feed stream of saline solution to the RO membrane desalination plant in order to reduce its hardness and thus the risk of scale formation.

The further concentration of the first byproduct stream from the RO membrane desalination plant by the method of the present invention allows then the ready reduction in the volume of highly saline waste streams and improvement in the productivity of the overall desalination process. For example, the use of the present invention allows a reduction in the volume of the highly saline streams (waste) by over 80%, and the remaining small volume of highly concentrated saline solution waste (second or third byproduct streams) may then be readily treated by conventional means such as evaporation.

These results are then surprisingly achieved without the need for high energy consumptions or large infrastructures and with reduced risks of scaling.

In particularly preferred embodiments of the process and the apparatus of the invention, the suspension crystallization unit is a multi-stage counter-current crystallization unit, for example, as disclosed in U.S. Pat. No. 6,719,954 B2.

In a preferred embodiment, the process comprises the additional step, wherein the second byproduct stream of the suspension crystallization unit is passed in a third desalination step through either a static crystallization unit or through the same or a second suspension crystallization unit to form a third product water stream having a reduced salt concentration relative to that of the second byproduct stream and a third byproduct stream having an increased salt concentration relative to that of the second byproduct stream. This additional step further reduces the volume of the first byproduct stream and increases the productivity of the process, and the third product water stream may be advantageously recycled by either feeding it into the first byproduct stream in a particularly preferred embodiment or into the RO membrane desalination plant in order to reduce operating costs.

Likewise a preferred embodiment of the apparatus additionally comprises a static crystallization unit or second suspension crystallization unit having an inlet in fluid communication with the outlet for a second byproduct stream of the suspension crystallization unit and outlets for a third product water stream and a third byproduct stream, in order to achieve the previously discussed benefits of the associated process embodiment. Similarly the outlet for a third product water stream may advantageously be in fluid communication with the first byproduct stream.

According to another preferred embodiment of the process, the salt concentration of the first byproduct stream is between about 3 to about 7 weight %, preferably between about 3.5 to about 7, more preferably between about 5 to about 7, most preferably between about 6 to about 7. Feeding the suspension crystallization unit with a stream having such salt concentrations ensure that the unit produces a second product water stream of sufficiently good quality, i.e. to be used as drinking water or for industrial applications such as cooling, while simultaneously minimizing the relative volume of the second byproduct stream (concentrated saline solution waste).

In yet another preferred embodiment of the process, the first byproduct stream is crystallized in the suspension crystallization unit at a temperature between about −1 to about −4° C., preferably about −1.5 to about −4, more preferably about −2 to about −4, most preferably about −3 to about −4. In still yet another preferred embodiment of the process having a third desalination step, the second byproduct stream is crystallized at a temperature between about −4 to about −13, preferably about −6 to about −10, most preferably about −7.5 to about −8.5. Reducing the crystallization temperature increases the relative volume of the second or third product water stream. On the other hand, too low a temperature becomes counterproductive in that the quality of the second product water stream deteriorates as the separation performance of the suspension crystallization unit decreases. Nonetheless it has been found that the quality of the second product water stream remains good enough that it may be of drinking water quality or recycled as a feed stream of saline solution into a RO membrane desalination plant, or the third product water stream may still be of sufficient quality to be fed back into the first byproduct stream and thus desalinated in the suspension crystallization unit. However at lower temperatures there is a greater risk of forming salt crystals and carbonate and sulphate precipitates. Therefore it has surprisingly been found that the previously-mentioned temperature ranges offer the best compromise between these various competing factors in yielding the preferred operating temperatures.

In still yet another preferred embodiment of the process, the first byproduct stream is passed through a heat exchanger thereby reducing its temperature prior to passing through the suspension crystallization unit. Reducing the temperature of the stream prior to entering the unit reduces the time and heat transfer required in the unit before the crystallization process can begin.

Likewise another preferred embodiment of the apparatus additionally comprises a heat exchanger having an inlet and an outlet, wherein the inlet of the heat exchanger is in fluid communication with the outlet for the first byproduct stream and the outlet of the heat exchanger is in fluid communication with the inlet of the suspension crystallization unit.

In still a further preferred embodiment of the process, the temperature of the first byproduct stream is reduced prior to entering the suspension crystallization unit, preferably to a temperature between about 2 to about 20° C., more preferably about 2 to about 10, most preferably about 2 to about 5. Reduction of the temperature to these ranges has been surprisingly found to provide the optimum benefit in increasing the productivity and reducing the processing time.

In yet another preferred embodiment of the process, the salt concentration of the second byproduct stream is between about 8 to about 18 weight %, preferably between about 10 to about 15, more preferably between about 12 to about 13. Maintaining a salt concentration in these ranges allows the process to operate with an optimum level of water recovery.

In a preferred embodiment of the process having a third desalination step in the same or a second crystallization unit, the second byproduct stream is passed through a second heat exchanger thereby reducing its temperature prior to passing through the same or second suspension crystallization unit so as to improve productivity and reduce the processing time. In another preferred embodiment of the process having a third desalination step, the temperature of the second byproduct stream is reduced prior to entering the same or second suspension crystallization unit, preferably to a temperature between about 2 to about 20° C., more preferably about 2 to about 10, most preferably about 2 to about 5. Similarly, in yet another preferred embodiment of the process having a third desalination step, the second byproduct stream is crystallized at a temperature between about −4 to about −13° C., preferably about −6 to about −10, more preferably about −7.5 to about −8.5. These temperature ranges for the temperature reduction of the stream and its subsequent crystallization make it possible to obtain the maximum benefit in improved productivity and processing time.

Likewise in a preferred embodiment of the apparatus having a second suspension crystallization unit comprises a second heat exchanger installed in line between the outlet for the second byproduct stream of the suspension crystallization unit and the inlet of the second suspension crystallization unit and having an inlet and an outlet, where the inlet of the second heat exchanger is in fluid communication with the outlet of the suspension crystallization unit and the outlet of the second heat exchanger is in fluid communication with the inlet of the second suspension crystallization unit in order to achieve the previously discussed benefits of the associated process embodiments.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one method claim may be combined with the subject matter of one or more other method claims or the subject matter of one or more apparatus claims or the subject matter of a mixture of one or more method claims and apparatus claims. By analogy, the subject matter of any one apparatus claim may be combined with the subject matter of one or more other apparatus claims or the subject matter of one or more method claims or the subject matter of a mixture of one or more method claims and apparatus claims. By way of example, the subject matter of claim 1 may be combined with the subject matter of any one of claims 11 to 15. In one embodiment, the subject matter of claim 11 is combined with the subject matter of any one of claims 1 to 10. In one specific embodiment, the subject matter of claim 12 is combined with the subject matter of claim 2. In another specific embodiment, the subject matter of claim 3 is combined with the subject matter of claim 12. By way of another example, the subject matter of claim 1 may also be combined with the subject matter of any two of claims 2 to 15. In one specific embodiment, the subject matter of claim 1 is combined with the subject matter of claims 2 and 12. In another specific embodiment, the subject matter of claim 11 is combined with the subject matters of claims 1 and 4. By way of example, the subject matter of claim 1 may be combined with the subject matter of any three of claims 2 to 15. In one specific embodiment, the subject matter of claim 1 is combined with the subject matters of claims 2, 9 and 12. In another specific embodiment, the subject matter of claim 12 is combined with the subject matters of claims 2, 3, and 5. In yet another specific embodiment, the subject matter of claim 1 is combined with the subject matters of claims 2 to 10. In yet another specific embodiment, the subject matter of claim 11 is combined with the subject matters of claims 12 to 15. By way of example, the subject matter of any one claim may be combined with the subject matters of any number of the other claims without limitation to the extent that such combinations are technically feasible.

One skilled in the art will understand that the combination of the subject matters of the various embodiments of the invention is possible without limitation in the invention. For example, the subject matter of one of the above-mentioned preferred embodiments may be combined with the subject matter of one or more of the other above-mentioned preferred embodiments without limitation. By way of example, according to a particularly preferred embodiment of the process, the salt concentration of the first byproduct stream is between about 3 to about 7 weight %, preferably between about 3.5 to about 7, more preferably between about 5 to about 7, most preferably between about 6 to about 7 and the salt concentration of the second byproduct stream is between about 8 to about 18 weight %, preferably between about 10 to about 15, more preferably between about 12 to about 13. By way of another example, according to another particularly preferred embodiment, the process comprises the additional steps wherein the second byproduct stream is passed in a third desalination step through a second suspension crystallization unit and both the first and second byproduct streams are passed through heat exchangers prior to their passing through the suspension crystallization units. By way of yet another example, according to another particularly preferred embodiment, the apparatus comprises a second suspension crystallization unit and a heat exchanger installed in line between the outlet of the suspension crystallization unit for the second byproduct stream and the inlet of the second suspension crystallization unit and having an inlet and an outlet, where the inlet of the heat exchanger is in fluid communication with the outlet of the suspension crystallization unit and the outlet of the heat exchanger is in fluid communication with the inlet of the second suspension crystallization unit, and where the outlet of the second suspension crystallization unit for a third product water stream is in fluid communication with the first byproduct stream.

BRIEF DESCRIPTION OF THE DRAWINGS

The invention will be explained in more detail hereinafter with reference to various embodiments of the invention as well as to the drawings. A single quotation mark (') after a reference number is used to indicate those features of the prior art. The schematic drawings show.

DETAILED DESCRIPTION OF THE INVENTION

Figure 1:
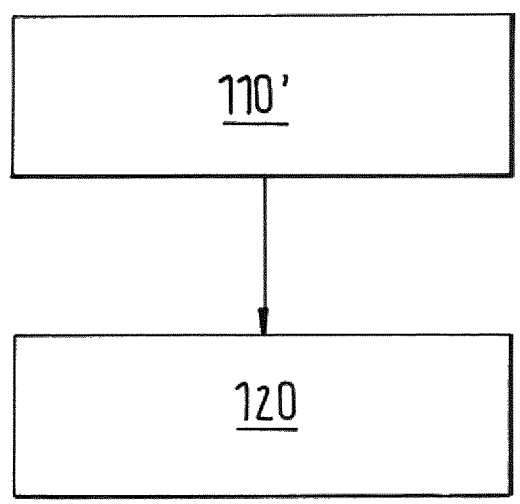
FIG. 1 shows a schematic view of an embodiment of the process for desalinating water according to the invention having a first and second desalination step.

FIG. 1 shows a schematic view of a process according to the invention which as a whole is labeled with reference number 100. The process 100 comprises a first desalination step, which is labeled as 110'; and a second desalination step, which is labeled as 120. In the first desalination step 110', a feed stream of saline solution 2' is passed through a reverse osmosis membrane desalination plant 3', wherein the plant 3' comprises at least one reverse osmosis desalination unit 4', to form a first product water stream 5' having a reduced salt concentration relative to that of the feed stream of saline solution 2' and a first byproduct stream 6' having an increased salt concentration relative to that of the feed stream of saline solution 2'. In the second desalination step 120 the first byproduct stream 6' is passed through a suspension crystallization unit 7 to form a second product water stream 8 having a reduced salt concentration relative to that of the first byproduct stream 6' and a second byproduct stream 9 having an increased salt concentration relative to that of the first byproduct stream 6'.

As shown in FIG. 1, as well as in FIGS. 2-6, the first byproduct stream 6' from the reverse osmosis desalination unit 4' is fed directly to the falling film crystallization unit 7 without passing through any intermediate concentrator or evaporator devices, such as a mechanical vapor compression unit or a thermal or a steam driven evaporator. Therefore the salt concentration of the first byproduct stream 6' remains relatively unchanged after it exits the reverse osmosis desalination unit 4' until it is fed directly to the falling film crystallization unit 7, as shown in these figures. The lack of such intermediate concentrator or evaporator devices has benefits in minimizing the complexity, investment and maintenance costs, and footprint of the apparatus and process for desalinating water.

In the specification and claims of this application, the salt concentration of saline solution is expressed as a weight % (weight salt/weight saline solution×100%). There are several well-known methods in the art to measure the salt concentrations of water, and they include Total Dissolved Solids (TDS) usually together with a mass salt balance, gravimetric determination of weight left upon evaporation of the water, melting point (or freezing point) determination, optical refractometry, UV/Vis spectrophotometry to detect the major components of ionic components in solution (e.g. using a HACH LANGE DR 5000 UV-Vis Spectrometer), full chemical analysis taking into account the charge balance for ions, and electrical conductivity measurements.

Electrical conductivity measurements are based on the measurement of the amount of electrical current conducted across a centimeter length of water column of unit cross-sectional area. Water containing a higher amount of dissolved salts has a higher conductivity. As used herein, the salt concentration in weight % is obtained by dividing the salt concentration in parts per million by 10000. The salt concentration (C) in units of parts per million (ppm) as used herein is determined by an electrical conductivity measurement, where the electrical conductivity (U) is expressed in units of milli-siemens per cm (mS/cm). The relationship between C in ppm and U in mS/cm is provided by the following equation:

$$C=((0.0154009*(U^3))-(2.67657*(U^2))+(922.071*(U))-(744.133))$$

Figure 2:
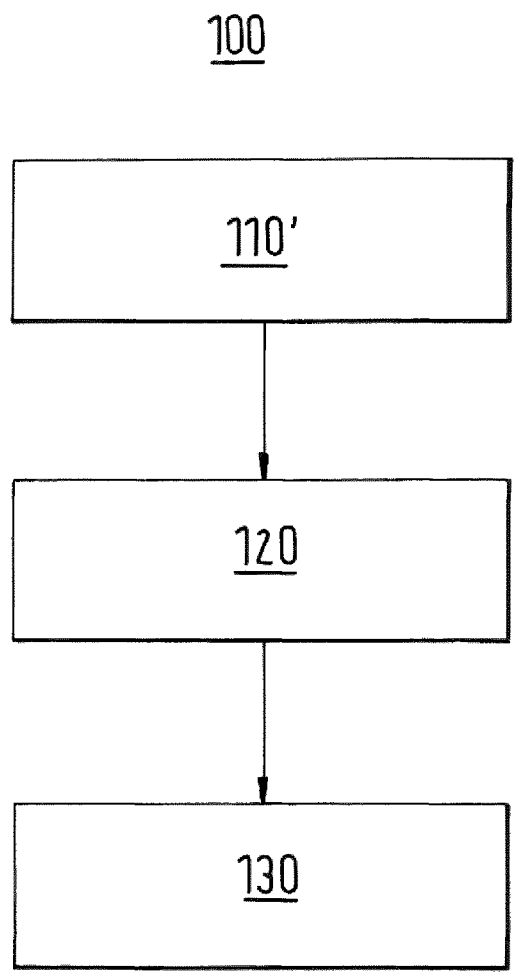
FIG. 2 shows a schematic view of a preferred embodiment of a process for desalinating water according to the invention, in which a third desalination step takes place in a static crystallization unit.

FIG. 2 shows a schematic view of a preferred embodiment of the invention which is a process 100 comprising a first desalination step 110', a second desalination step 120, and a third desalination step, which takes place in a static crystallization unit 10, which is labeled as 130. In the third desalination step 130, a third product water stream 12 having a reduced salt concentration relative to that of the second byproduct stream 9 and a third byproduct stream 13 having an increased salt concentration relative to that of the second byproduct stream 9 are formed. As discussed earlier, this additional step beneficially reduces the volume of the discharged concentrated saline solution and increases the productivity, and the third product water stream 12 may be advantageously recycled in one embodiment by feeding it into the first byproduct stream 6'.

Figure 3:
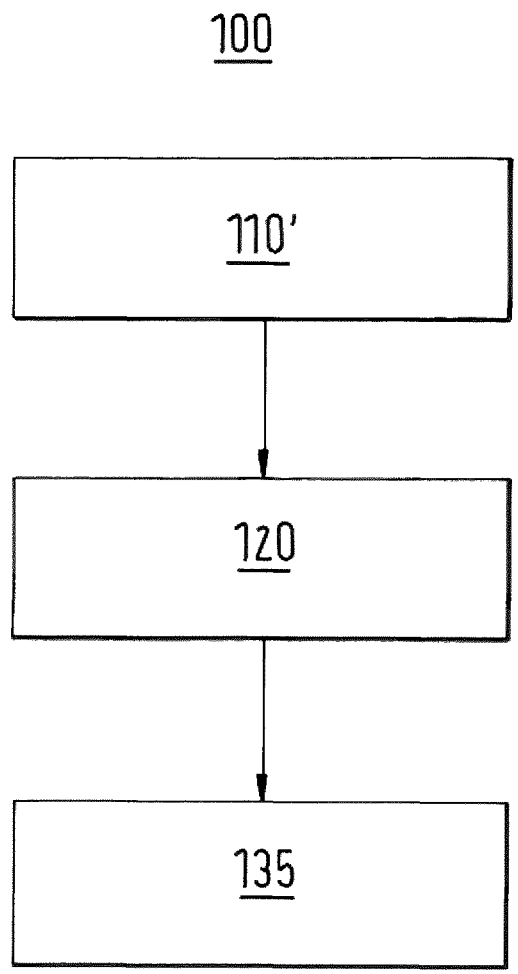
FIG. 3 shows a schematic view of a preferred embodiment of a process for desalinating water according to the invention, in which a third desalination step takes place in a second suspension crystallization unit.

FIG. 3 shows a schematic view of another preferred embodiment of the invention which is a process 100 comprising a first desalination step 110', a second desalination step 120, and a third desalination step, which takes place in the same 7 or a second suspension crystallization unit 11, which is labeled as 135. In the third desalination step 135, a third product water stream 12 having a reduced salt concentration relative to that of the second byproduct stream 9 and a third byproduct stream 13 having an increased salt concentration relative to that of the second byproduct stream 9 are formed. This preferred embodiment has similar advantages to that of the one shown in FIG. 2, and the third product water stream 12 may be advantageously recycled in one embodiment by feeding it into the first byproduct stream 6'.

The first desalination step 110' and its feed stream of saline solution 2', reverse osmosis membrane desalination plant 3', reverse osmosis desalination unit 4', first product water stream 5', and first byproduct stream 6' are all conventional and well-known in the art, for example, as disclosed in U.S. Pat. No. 4,125,463.

Preferred process conditions for the second desalination step 120 are the same for the process of the invention as shown in FIG. 1 and its preferred embodiments shown in FIG. 2 and FIG. 3 unless otherwise specifically indicated. Suspension crystallization units 7 and their operation are well-known in the art, for example, as disclosed in U.S. Pat. No. 6,241,954 B1. A Unless indicated otherwise, conventional suspension crystallization units 7 may be used and operated as known in the art for the second desalination step 120 and third desalination step 130.

Static crystallization units 10 and their operation are well-known in the art, for example, as disclosed in Sulzer Technical Review 2/99 pp. 8-11, Sulzer Technical Review 1/2006 pp. 4-6, or U.S. Pat. No. 6,145,340. Unless indicated otherwise, a conventional static crystallization unit 10 may be used and operated as known in the art for the third desalination step 130.

A particularly preferred embodiment of a suspension crystallization unit 7 for use in both the process and the apparatus of the invention is a multi-stage counter-current crystallization unit 71, for example, as disclosed in U.S. Pat. No. 6,719,954 B2. In such a unit 71, an additional suspension crystallization stage takes place within the same unit 71. The unit 71 has several advantages since it allows the suspension crystallization to be carried out in several concentration stages within the same unit. Therefore the use of a multi-stage crystallization unit 71 is more economical than the use of two or more single stages in one or more single stage crystallizers.

In principle, freezing-desalination technology has many advantages over other conventional desalination processes for treating highly concentrated saline solutions, especially its lower energy requirement and reduced scaling, fouling, and corrosion problems. Due to the low operating temperatures of freezing-desalination technology, no special materials of construction (e.g. corrosion resistant) are required.

The various product and byproduct streams from the crystallization units may be conveniently controlled by means of the mass balance in collecting vessels directly connected to the crystallization unit. The heating and cooling requirements of the crystallization units are varying as a function of time, and energy buffer systems may be advantageously used in order to minimize the fluctuations in the demands for steam and refrigeration. In the case of a batch operation, streams may be stored in buffer vessels prior to their passing through a specific crystallization unit. The crystallization units may be conveniently controlled by a computer system using level and temperature measurement instruments, as well as on/off or control valves.

Additional information on crystallizers and their operation is disclosed in Handbook of Industrial Crystallization, $2^{nd}$ Edition, by Allan S. Myerson, published Jan. 9, 2002 by Butterworth-Heinemann, Woburn, Mass. ISBN: 978-0750670128 and Crystallization Technology Handbook, $2^{nd}$ Edition, edited by A. Mersmann, published 2001 by Marcel Dekker, Basel, ISBN: 0-8247-0528-9.

In one embodiment, the salt concentration of the first byproduct stream 6' is between about 3 to about 7 weight %, preferably between about 3.5 to about 7, more preferably between about 5 to about 7, most preferably between about 6 to about 7. As discussed earlier, feeding the suspension crystallization unit 7 with a stream 6' having such salt concentrations ensures that the unit 7 produces a second product water stream 8 of sufficiently good quality, while simultaneously minimizing the volume of the first byproduct stream 6' and any discharged concentrated saline solution.

In another embodiment, the first byproduct stream 6' is crystallized in the suspension crystallization unit 7 at a temperature between about −1 to about −4° C., preferably about −1.5 to about −4, more preferably about −2 to about −4, most preferably about −3 to about −4. As discussed earlier, such temperature ranges offer a process optimum in terms of the quality and volume of the second product water stream 8.

The temperature of the crystallization in a specific crystallization unit as referred to in the specification and application of this application is expressed in degrees Celsius (° C.), and it is measured by measuring the melting point of the product water stream removed from the specific crystallization unit.

In still another embodiment, the first byproduct stream 6' is passed through a heat exchanger 14 thereby reducing its temperature prior to passing through the suspension crystallization unit 7. As discussed earlier, reducing the temperature of the first byproduct stream 6' reduces the time and heat transfer required before crystallization can begin.

In yet another embodiment, the temperature of the first byproduct stream 6' is reduced prior to entering the suspension crystallization unit 7, preferably to a temperature between about 2 to about 20° C., more preferably about 2 to about 10, most preferably about 2 to about 5. Similarly, in yet another preferred embodiment, the second byproduct stream is crystallized at a temperature between about −4 to about −13° C., preferably about −6 to about −10, more preferably about −7.5 to about −8.5. These temperature ranges for the temperature reduction of the stream and its subsequent crystallization make it possible to obtain the maximum benefit in improved productivity and reduced processing time.

In the specification and claims of this application, the temperature of a byproduct stream prior to entering a specific crystallization unit is expressed in degrees Celsius (° C.), and it is measured by an in-line temperature sensor placed immediately before the inlet of the specific crystallization unit.

In still yet another embodiment, the salt concentration of the second byproduct stream 9 is between about 8 to about 18 weight %, preferably between about 10 to about 15, more preferably between about 12 to about 13. As discussed earlier, these ranges act to optimize the water recovery of the process.

In embodiments of the process of the invention in which a third desalination step 135 takes place in the same suspension crystallization unit 7 or a second suspension crystallization unit 11, for example, such as that shown in FIG. 3, in some specific further embodiments the second byproduct stream 9 is passed through a second heat exchanger 15 thereby reducing its temperature prior to passing through the same 7 or second suspension crystallization unit 11. In other specific further embodiments the temperature of the second byproduct stream 9 is reduced prior to entering the second suspension crystallization unit 11. Preferably the temperatures are reduced to a temperature between about 2 to about 20° C., more preferably about 2 to about 10, most preferably about 2 to about 5. Similarly, in yet another preferred embodiment of the process having a third desalination step, the second byproduct stream is crystallized at a temperature between about −4 to about −13° C., preferably about −6 to about −10, more preferably about −7.5 to about −8.5. These temperature ranges for the temperature reduction of the stream and its subsequent crystallization make it possible to obtain the maximum benefit in improved productivity and reduced processing time.

It will be understood by one skilled in the art that the use of very low crystallization temperatures in order to achieve even higher salt concentrations of the byproduct stream will be limited in practice to a maximum salt concentration of about 23 weight % due to the eutectic point of saline solution.

In the case of those embodiments having a third desalination step in the same suspension crystallization unit 7, it will be understood by one skilled in the art that the second byproduct stream 9 may be conveniently stored in a buffer vessel between the second and third desalination step.

Figure 4:
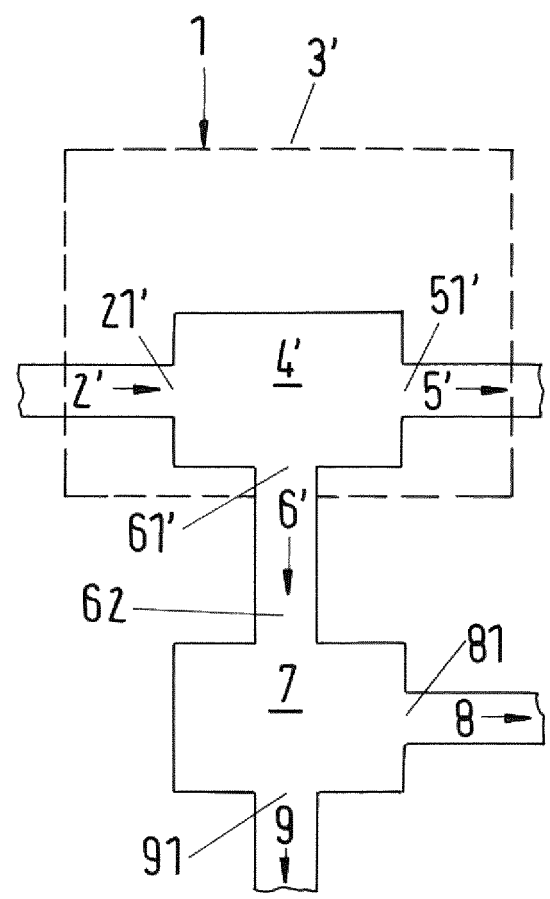
FIG. 4 shows a schematic view of an embodiment of an apparatus according to the invention for carrying out a process for desalinating water according to the invention having a first and second desalination step.

FIG. 4 shows a schematic view of an apparatus according to the invention which as a whole is labeled with reference number 1. The apparatus 1 comprises a reverse osmosis membrane desalination plant 3' comprising at least one reverse osmosis desalination unit 4' having an inlet 21' for a feed stream of saline solution 2', an outlet 51' for a first product water stream 5', an outlet 61' for a first byproduct stream 6', wherein the outlet 61' is in fluid connection with an inlet 62 of a suspension crystallization unit 7 having an outlet 81 for a second product water stream 8, and an outlet 91 for a second byproduct stream 9.

Figure 5:
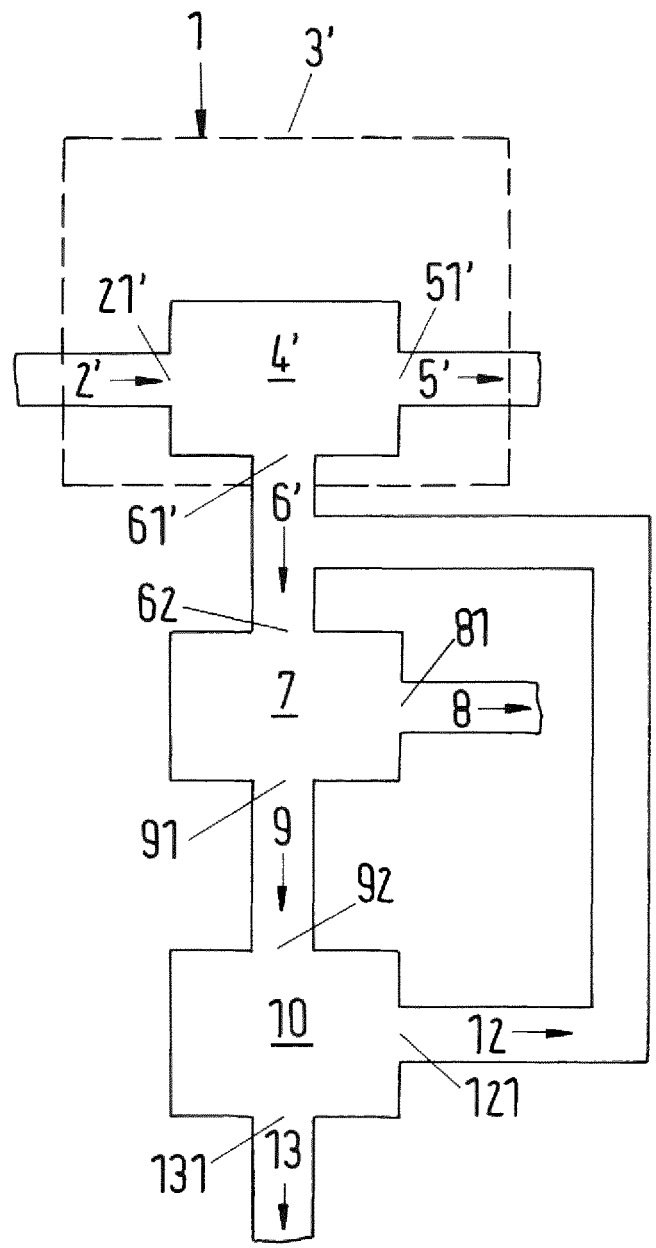
FIG. 5 shows a schematic view of a preferred embodiment of an apparatus for carrying out a process for desalinating water according to the invention, in which a third desalination step takes place in a static crystallization unit.

FIG. 5 shows a schematic view of a preferred embodiment of the invention which is an apparatus 1 as shown in FIG. 4, but wherein the apparatus 1 additionally comprises a static crystallization unit 10 having an inlet 92 in fluid communication with the outlet 91 of the suspension crystallization unit 7 and an outlet 121 for a third product water stream 12 and an outlet 131 for a third byproduct stream 13.

Figure 6:
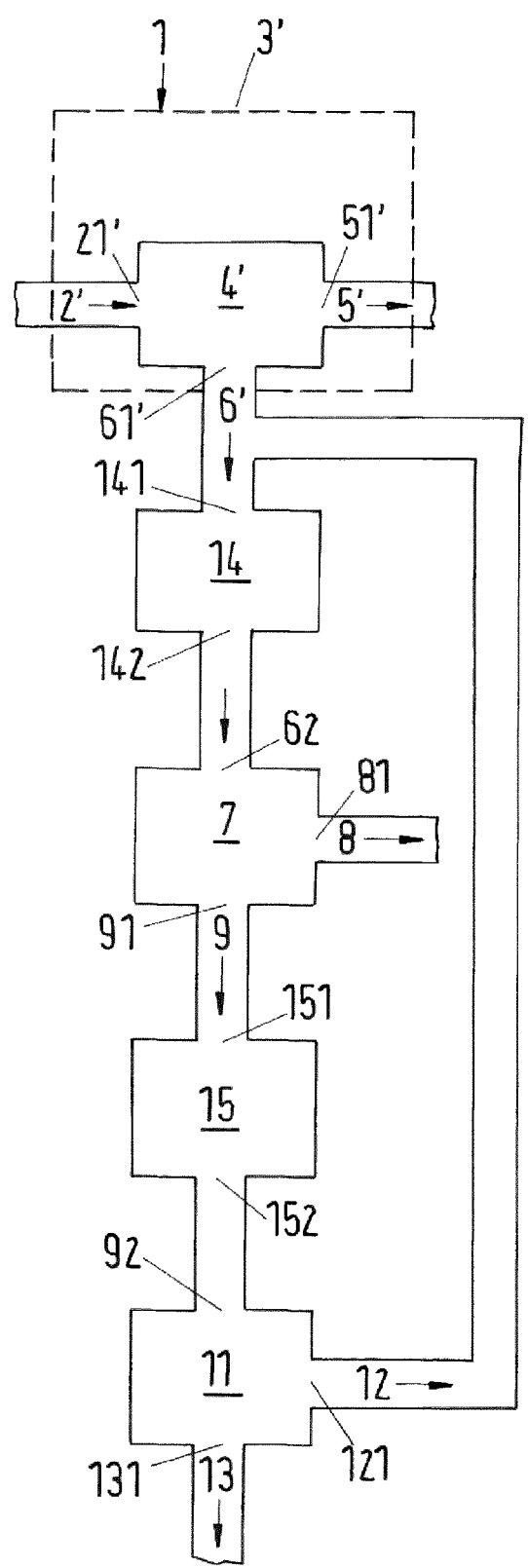
FIG. 6 shows a schematic view of a preferred embodiment of an apparatus for carrying out a process for desalinating water according to the invention, in which a third desalination step takes place in a static crystallization unit.

FIG. 6 shows a schematic view of another preferred embodiment of the invention which is an apparatus 1 as shown in FIG. 4, but wherein the apparatus 1 additionally comprises a heat exchanger 14 having an inlet 141 and an outlet 142, wherein the inlet 141 is in fluid communication with the outlet 61' and the outlet 142 is in fluid communication with the inlet 62 of the suspension crystallization unit 7. The apparatus 1 also additionally comprises a second suspension crystallization unit 11 having an inlet 92 in fluid communication with the outlet 91 of the suspension crystallization unit 7 and an outlet 121 for a third product water stream 12 and an outlet 131 for a third byproduct stream 13, and a second heat exchanger 15 installed in line between the outlet 91 and the inlet 92 of the second suspension crystallization unit 11 and having an inlet 151 and an outlet 152, where the inlet 151 is in fluid communication with the outlet 91 and the outlet 152 is in fluid communication with the inlet 92 of the second suspension crystallization unit 11.

Preferred apparatus configurations for the suspension crystallization unit 7 are the same for the apparatus of the invention as shown in FIG. 4 and its preferred embodiments shown in FIG. 5 and FIG. 6 unless otherwise specifically indicated. As discussed earlier, the reverse osmosis membrane desalination plant 3', reverse osmosis desalination unit 4', inlet 21', outlet 51', and outlet 61' are all conventional and well-known in the art, for example, as disclosed in U.S. Pat. No. 4,125,463. Suspension crystallization units 7 and 11 are also well-known and disclosed in U.S. Pat. No. 6,241,954 B1, and they may be conventionally used and operated in the invention as described in the art unless specifically indicated otherwise. As discussed earlier, a preferred embodiment of a suspension crystallization unit 7 for use in the process or apparatus of the invention is a multi-stage counter-current crystallization unit 71. Static crystallization units 11 are also well-known and disclosed in as disclosed in Sulzer Technical Review 2/99 pp. 8-11, Sulzer Technical Review 1/2006 pp. 4-6, or U.S. Pat. No. 6,145,340, and they too may be conventionally used and operated in the invention as described in the art unless specifically indicated otherwise.

In some specific preferred embodiments of the apparatus 1 comprising a static crystallization unit 10 or a second suspension crystallization unit 11 having an inlet 92 in fluid communication with the outlet 91 of the suspension crystallization unit 7 and an outlet 121 for a third product water stream 12 and an outlet 131 for a third byproduct stream 13, such as the embodiments shown in FIG. 5 or FIG. 6, the outlet 121 for a third product water stream 12 is in fluid communication with the first byproduct stream 6' in order to advantageously recycle the stream 12 in specific embodiments.

In some embodiments of the apparatus 1, such as the preferred embodiment shown in FIG. 6, the apparatus 1 additionally comprises a heat exchanger 14 and/or a second heat exchanger 15. As discussed earlier, the use of a heat exchangers beneficially reduces the time and heat transfer required before the crystallization can begin.

Figure 7:
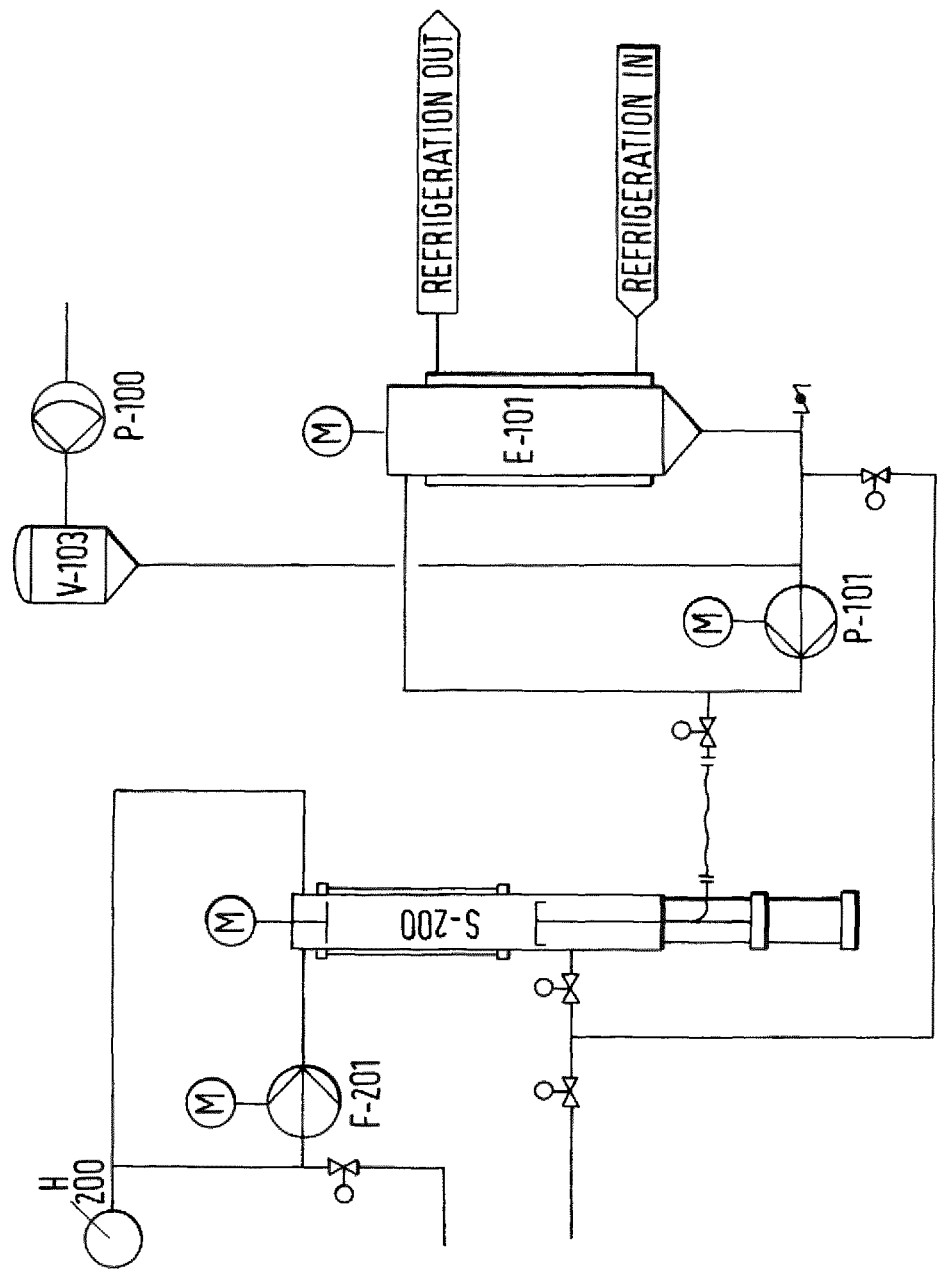
FIG. 7 shows a process flow diagram (PFD) of an embodiment of a typical suspension crystallization unit.

FIG. 7 shows a process flow diagram of an embodiment of a typical suspension crystallization unit. Feed enters the unit by gravity via the feed vessel V-103 located at the upper level of the main skid. The feed vessel is filled with the feed pump P-100. Vessel E-101 combines the function of scraped wall crystallizer (inner tube surrounded by a shell containing the refrigerant medium) for the production of ice crystals and that of a growth vessel where those crystals are given sufficient residence time to grow to a size that can be handled by the wash column S-200.

After start-up the refrigerant cools the product as heat transfer occurs between the inner tube and the shell. As the refrigerant absorbs the heat from the slurry there is some degree of under-cooling (liquid temperature below equilibrium temperature) of the water. Once the freezing point of the feed is reached, ice crystals (nuclei) start to form. The percentage of ice crystals increase slowly. The inner tube employs a rotating shaft which is fitted with scraper blades. The blades continuously scrape the inner wall of the tube. This keeps the tube surface free of crystals during the operation which is important for efficient heat transfer.

The slurry of ice crystals is continuously re-circulated over the crystallizer by means of the circulation pump P-101. The entire unit is kept filled by the atmospheric feed vessel V-103 located above the main unit. Usually the main unit is kept under slight overpressure with a nitrogen blanketing system.

From the main circulation loop the mixture of ice and second or third byproduct streams 9 or 13 are fed to the wash column S-200 where the ice is separated from the concentrate.

The ice is melted in the melter and discharged from the system through an automatic valve. Second or third byproduct streams 9 or 13 are discharged through an automatic valve from the wash column filtrate line.

The wash column is a mechanical separation device which removes ice crystals from the second or third byproduct streams 9 or 13 (concentrated saline solution). The main body of the wash column is a cylinder. Inside the cylinder a piston moves up- and downwards creating a compact crystal bed. The efficiency of the wash column depends on crystal size and viscosity of the product. Larger crystals and lower viscosity make the separation more efficient.

The second or third product streams 8 or 12 are discharged from the wash column, and the filtrate is recycled to the crystallizer/growth section. The discharged second or third product streams 8 or 12 is replaced by the first byproduct stream 6' discharged from the RO plant. The non-crystallizing components in the second or third byproduct streams 9 or 13 accumulate in the unit.

After the desired crystallization temperature is reached (corresponding to a certain concentration of non-crystallizing components in the second or third byproduct streams 9 or 13), the removal of concentrated water is started. The concentrated water leaves the plant through the wash column as a side stream of the filtrate flow.

Figure 8:
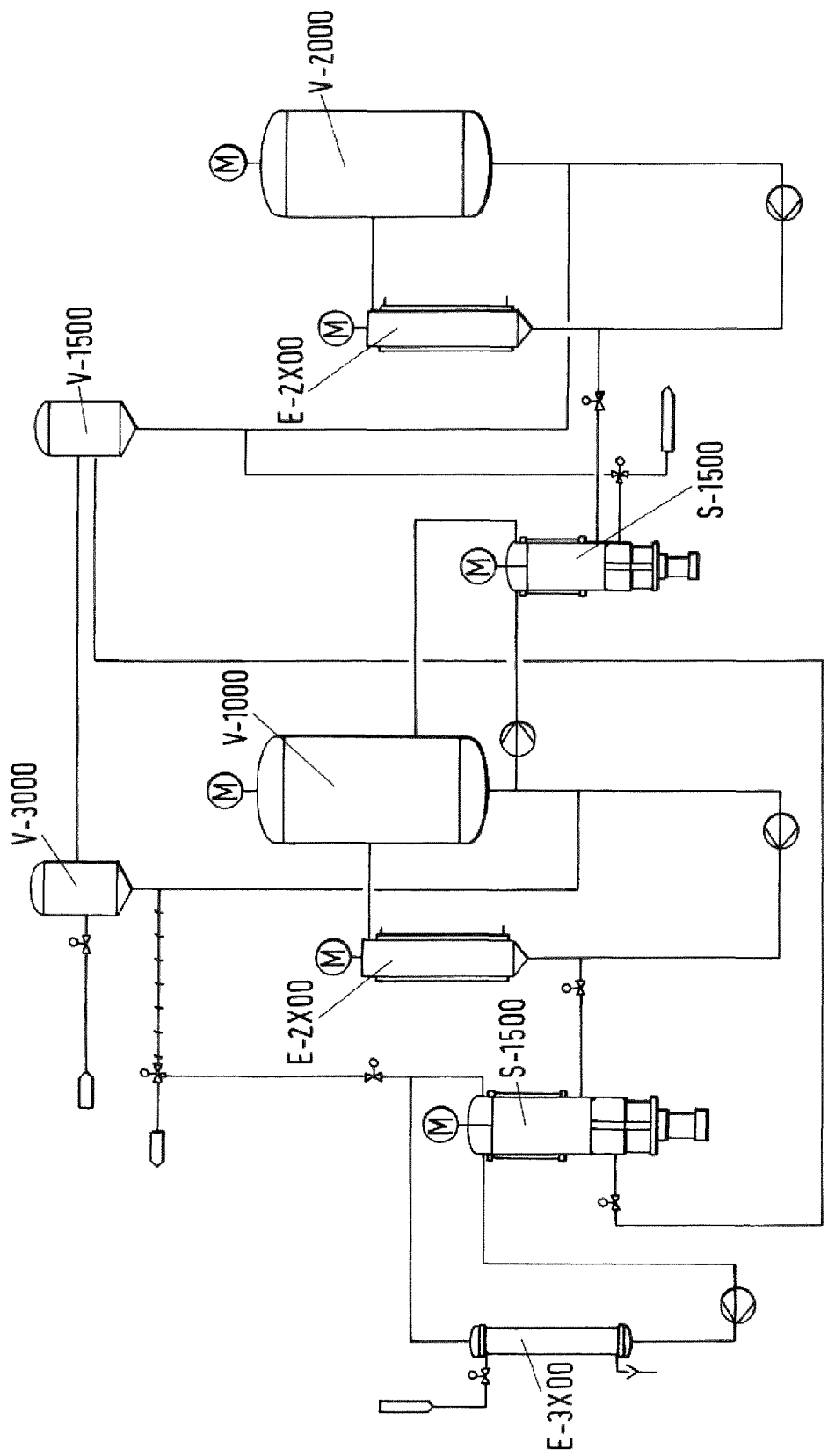
FIG. 8 shows a process flow diagram (PFD) of an embodiment of a multi-stage counter-current crystallization apparatus.

FIG. 8 shows a process flow diagram (PFD) of an embodiment of a typical multi-stage counter-current crystallization unit 71, which is a preferred type of suspension crystallization unit 7.

In this PFD, feed enters the main loop of the low concentration stage by gravity via feed vessel, V-3000. The main loop further consists of one or more crystallizers, E2X00, one or more slurry circulation pumps, P-2X01, and a crystal growth vessel, V-2000. Associated with the low concentration stage is/are one or more wash columns, S-1500, with melt-loop pump, P-3X01 and ice melter, E-3X00. Water is discharged from the low concentration stage. The filtrate from the wash column is send to the feed vessel, V1500, of the high concentration stage. Excess feed is returned to the feed vessel of the low concentration stage by an overflow line.

The high concentration stage is similar to the low concentration stage. However slurry from the main loop is now sent to a so-called thickener, S-1500. A thickener is a wash column where the ice is not washed and not melted. The thickener merely compresses the slurry to form a compact ice bed. Filtrate from the thickener is discharged from the plant as product or returned to the main slurry loop of the high concentration stage. The compacted ice bed is re-slurried in a slurry circulation loop from and to the low concentration stage.

Yet another aspect of the invention is the use of the process or the apparatus 1 for the reduction of the volume of first byproduct stream 6' (concentrated saline solution waste) of a reverse osmosis membrane desalination plant 3', preferably an in-land desalination plant 3', or in a device or plant or process for producing desalinated water, for salt production, for co-production of power and desalinated water, or for air conditioning. Incorporation of the invention to a RO plant allows for a reduction of the required capacity of the RO plant and thus investment for a particular application. For example, productivity is increased by the use of the invention in that less saline solution feed is required because some of the water that would otherwise be lost is recovered. In addition these various uses typically benefit in a reduction of maintenance costs due to the use of proven crystallization units and technologies.

EXAMPLES

The following examples are set forth to provide those of ordinary skill in the art with a detailed description of how the processes, apparatuses and uses claimed herein are evaluated, and they are not intended to limit the scope of what the inventors regard as their invention. Unless indicated otherwise, parts are by weight, and temperature is in degrees Celsius (° C.).

The pilot plant used in the examples had the configuration shown in FIG. 7 and described earlier. The temperature of the heat transfer medium (HTM) was between 15 and −19° C. The temperature of the feed (the first byproduct stream 6') was 15° C., and the final operating temperature was −19° C.

The weights of all streams removed from the crystallizer were measured using a digital balance, and freezing point measurements were carried out where appropriate (at lower purities, where deviations from the pure product freezing point are significant enough to be detected). Samples were taken during the test runs and analyzed.

The salt concentration (C) was determined by an electrical conductivity measurement, where the electrical conductivity (U) is expressed in units of milli-siemens per cm (mS/cm). The relationship between C in ppm and U in mS/cm is provided by the following equation:

$$C=((0.0154009*(U^3))-(2.67657*(U^2))+(922.071*(U))-(744.133))$$

The water recovery (WR) in percent (%) in the examples was determined by the following equation:

$$WR=(w_p/w_f)*100\%$$

wherein $w_p$=weight of the product and $w_f$=weight of the feed.

The salt rejection (SR) in percent (%) in the examples was determined by the following equation:

$$SR=(1-x_p/x_f)*100\%$$

wherein $x_p$=salt concentration in the product and $x_f$=salt concentration in the feed.

Examples 1 to 3

Figure 9:
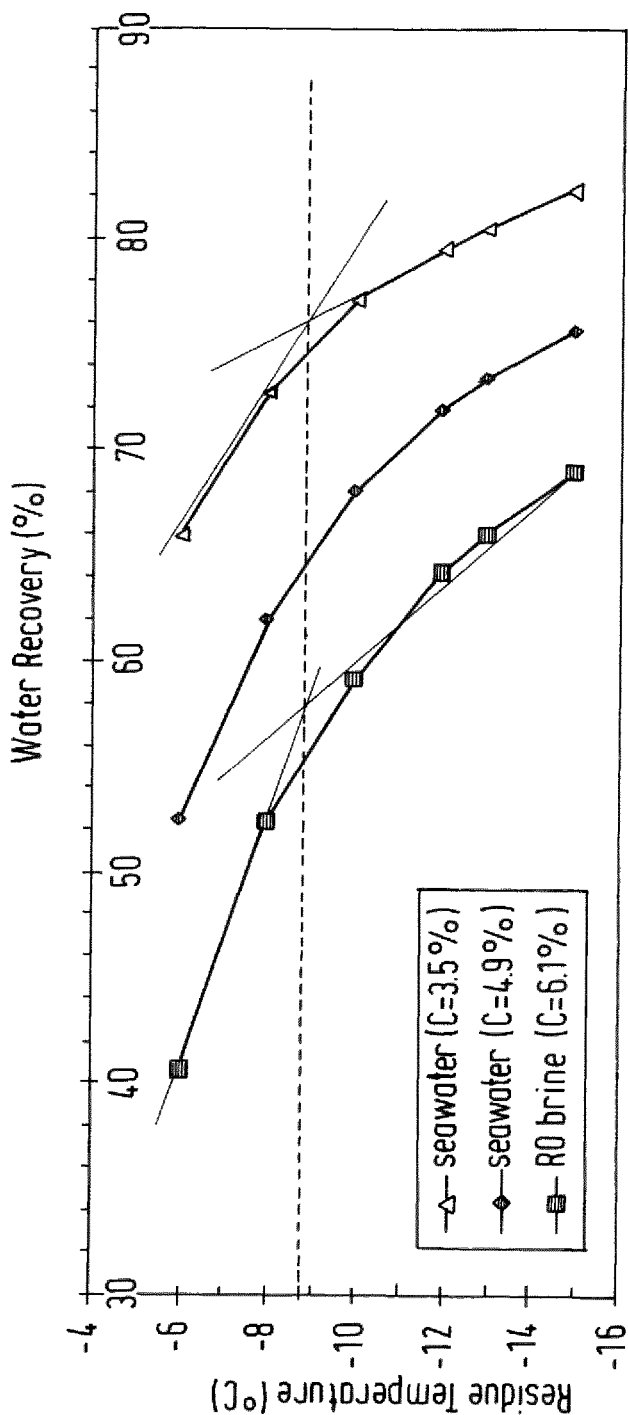
FIG. 9 shows the water recovery versus residue temperature obtained in examples according to the invention for three different salt concentrations of the first byproduct stream.

In these examples, a saline solution feed stream (first byproduct stream 6') having a salt concentration of from 3.5 to 6.1 weight % was treated in a second desalination step 120 by crystallization in a single stage of the suspension crystallization pilot plant and yielded the results shown in Tables 1 to 3. It is noted that Examples 2 and 3 are both based on computational modeling of the process in the plant. FIG. 9 summarizes the water recovery versus residue temperature obtained in Examples 1 to 3.

The examples demonstrate that the process and apparatus of the invention may be usefully used in treating the first byproduct stream 6' (waste effluent streams) of RO membrane desalination plants having a variety of saline solution concentrations. Nonetheless the data in the tables and figure show that it will generally be preferred to have a salt concentration between about 3 and about 7 weight %. In order to have the most economical usage of the RO membrane plant, the salt concentration will be higher, most preferably between about 6 and about 7 weight %.

FIG. 9 demonstrates that an optimum result is obtained when the residue (second byproduct stream 9) is concentrated to −8 to −9° C., which results in a salt concentration of between about 13 to about 14 weight %. This process setting gives nearly the best water recovery and salt rejection and thus an optimum result. Higher residue temperatures (≥−7° C.) give poorer water recovery. Lower residue temperatures (≤−9° C.) require much higher energy costs without offering any significant increase in the water recovery. Furthermore the product purity is lower for such very low residue temperatures.

Example 4

In this example, a suspension crystallization was carried out as in Example 1, and the residue (second byproduct stream 9) was passed in a third desalination step 130 through a static crystallization unit 10. The pilot plant used in this example consisted of a standard static crystallization unit of a 70 liter crystallizer, equipped with the same type of crystallizer elements as used for industrial crystallizers. It therefore avoids any risk in the design for final capacity as no scale up needs to be done.

In this example, a sweating stage was incorporated, which results in a higher product purity and higher salt rejection; however, the water recovery and yield are somewhat reduced and larger equipment and a longer processing time is required. One skilled in the art will understand how to make trade-offs in these particular aspects in order to obtain an optimized result for a particular situation and requirements.

This example demonstrates that the second byproduct stream 9 of a suspension crystallization unit 7 may be advantageously treated in a third desalination step 130 in a static crystallization unit 10 to provide a third product water stream 12 of sufficient purity (about 4-6 weight % salt) that it may be fed back to the feed of the reverse osmosis desalination unit 4' or to the first byproduct stream 6', thus increasing the overall water recovery.

Crystallizing the residue (third product water stream 12) at temperatures of −16 to −17° C. results in a residue with a salt concentration of about 21 weight %. Elevated residue temperatures may be used, but they result in lower water recovery and salt rejection values. Even lower residue temperatures may be used, but this has higher energy costs. Furthermore achieving even lower temperatures becomes limited by the eutectic point at a salt concentration of about 23 weight %.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

TABLE 1

Example 1

| Parameters | Units | $1^{st}$ byproduct stream 6' | $2^{nd}$ product water stream 8 | $2^{nd}$ byproduct stream 9 |
| --- | --- | --- | --- | --- |
| Salt Concentration | (%) | 6.1 | 0.011 | 13.0 |
| Melting Point | (° C.) | −3.1 | −0.03 | −8.1 |
| Water Recovery | (%) |  | 53 |  |
| Salt Rejection | (%) |  | 99.82 |  |

TABLE 2

Example 2

| Parameters | Units | $1^{st}$ byproduct stream 6' | $2^{nd}$ product water stream 8 | $2^{nd}$ byproduct stream 9 |
| --- | --- | --- | --- | --- |
| Salt Concentration | (%) | 3.5 | 0.01 | 13 |
| Melting Point | (° C.) | −2 | −0.01 | −8 |
| Water Recovery | (%) |  | 73 |  |
| Salt Rejection | (%) |  | 99.8 |  |

TABLE 3

Example 3

| Parameters | Units | $1^{st}$ byproduct stream 6' | $2^{nd}$ product water stream 8 | $2^{nd}$ byproduct stream 9 |
| --- | --- | --- | --- | --- |
| Salt Concentration | (%) | 4.9 | 0.01 | 13 |
| Freezing Point | (° C.) | −2.4 | −0.01 | −8 |
| Water Recovery | (%) |  | 63 |  |
| Salt Rejection | (%) |  | 99.8 |  |

TABLE 4

Example 4

| Parameters | Units | $2^{nd}$ byproduct stream 9 | $3^{rd}$ product water stream 12 | $3^{rd}$ byproduct stream 13 |
| --- | --- | --- | --- | --- |
| Salt Percent | (%) | 13.00 | 5.25 | 20.89 |
| Freezing Point | (° C.) | −7.97 | −2.83 | −16.47 |
| Water Recovery | (%) |  | 49.84 |  |
| Salt Rejection | (%) |  | 59.62 |  |

The invention claimed is:

1. A process for desalinating water comprising the steps of:
    passing a feed stream of saline solution in a first desalination step through a reverse osmosis membrane desalination plant comprising at least one reverse osmosis desalination unit to form a first product water stream having a reduced salt concentration relative to that of the feed stream of saline solution and a first byproduct stream having an increased salt concentration relative to that of the feed stream of saline solution,
    wherein the first byproduct stream is passed in a second desalination step through a first suspension crystallization unit to form a second product water stream having a reduced salt concentration relative to that of the first byproduct stream and a second byproduct stream having an increased salt concentration relative to that of the first byproduct stream,
    wherein the second byproduct stream is passed in a third desalination step through a static crystallization unit to form a third product water stream having a reduced salt concentration relative to that of the second byproduct stream and a third byproduct stream having an increased salt concentration relative to that of the second byproduct stream, and
    wherein the salt concentration of the first byproduct stream is between about 3 to about 7 weight %.

2. The process of claim 1, wherein the first suspension crystallization unit is a multi-stage counter-current crystallization unit.

3. The process of claim 1, wherein the third product water stream is fed into the first byproduct stream.

4. The process of claim 1, wherein the first byproduct stream is crystallized in the first suspension crystallization unit at a temperature between about −1 to about −4° C.

5. The process of claim 1, wherein the first byproduct stream is passed through a first heat exchanger thereby reducing its temperature prior to passing through the first suspension crystallization unit.

6. The process of claim 1, wherein the temperature of the first byproduct stream is reduced prior to entering the first suspension crystallization unit.

7. The process of claim 6, wherein the temperature of the first byproduct stream is reduced to a temperature between about 2 and about 20° C.

8. The process of claim 1, wherein the salt concentration of the second byproduct stream is between about 8 and about 18 weight %.

9. The process of claim 1, wherein the second byproduct stream is crystallized in the static crystallization unit at a temperature between about −4 to about −13° C.

10. The process of claim 1, wherein the second byproduct stream is passed through a second heat exchanger thereby reducing its temperature prior to passing through the static crystallization unit.

11. The process of claim 10, wherein the temperature of the second byproduct stream is reduced to a temperature between about 2 to about 20° C.

12. An apparatus for carrying out a process for desalinating water, the apparatus comprising:
a reverse osmosis membrane desalination plant comprising at least one reverse osmosis desalination unit having an inlet for a feed stream of saline solution, an outlet for a first product water stream, an outlet for a first byproduct stream, wherein the outlet for a first byproduct stream is in fluid communication with an inlet of a first suspension crystallization unit having an outlet for a second product water stream, and an outlet for a second byproduct stream,
the apparatus additionally comprising a static crystallization unit having an inlet in fluid communication with the outlet for the second byproduct stream of the first suspension crystallization unit and an outlet for a third product water stream and an outlet for a third byproduct stream.

13. The apparatus of claim 12, wherein the first suspension crystallization unit is a multi-stage counter-current crystallization unit.

14. The apparatus of claim 12, wherein, in use, the feed stream of saline solution in a first desalination step is passed through the reverse osmosis membrane desalination plant to form the first product water stream having a reduced salt concentration relative to that of the feed stream of saline solution and the first byproduct stream having an increased salt concentration relative to that of the feed stream of saline solution,
wherein, in use, the first byproduct stream is passed in a second desalination step through the first suspension crystallization unit to form the second product water stream having a reduced salt concentration relative to that of the first byproduct stream and the second byproduct stream having an increased salt concentration relative to that of the first byproduct stream.

15. The apparatus of claim 12, further comprising a second heat exchanger installed in line between the outlet for a second byproduct stream and the inlet of the static crystallization unit and wherein the second heat exchanger has an inlet and an outlet, wherein the inlet of the second heat exchanger is in fluid communication with the outlet for a second byproduct stream and the outlet of the second heat exchanger is in fluid communication with the inlet of the static crystallization unit.

16. The apparatus of claim 12, wherein the outlet for a third product water stream is in fluid communication with the first byproduct stream.

17. The apparatus of claim 12, additionally comprising a first heat exchanger having an inlet and an outlet, wherein the inlet of the first heat exchanger is in fluid communication with the outlet for a first byproduct stream and the outlet of the first heat exchanger is in fluid communication with the inlet of the first suspension crystallization unit.

18. A method for the reduction of the volume of the first byproduct stream of a reverse osmosis membrane desalination plant, or in a device or plant or process for producing desalinated water, for salt production, for co-production of power and desalinated water, or for air conditioning, the method comprising the steps of:
(I) providing the apparatus of claim 12,
(II) introducing a feed stream of saline solution to the inlet of the desalination unit of the apparatus provided in step (I).

19. The method of claim 18, wherein steps (I) and (II) are performed at an in-land reverse osmosis membrane desalination plant.

* * * * *